United States Patent
Honeycutt et al.

(10) Patent No.: US 10,853,886 B1
(45) Date of Patent: Dec. 1, 2020

(54) SYSTEMS AND METHODS FOR A VIRTUAL CASH REGISTER

(71) Applicant: Wells Fargo Bank, N.A., San Francisco, CA (US)

(72) Inventors: Margaret Honeycutt, Crockett, CA (US); Caroline Machado, Mountain View, CA (US); William Ward Sutton, Walnut Creek, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1317 days.

(21) Appl. No.: 14/883,367

(22) Filed: Oct. 14, 2015

(51) Int. Cl.
*G06Q 40/00* (2012.01)
*G06Q 20/20* (2012.01)
*G06Q 20/12* (2012.01)
*G06F 7/08* (2006.01)
*G06Q 20/06* (2012.01)

(52) U.S. Cl.
CPC .................. *G06Q 40/12* (2013.12)

(58) Field of Classification Search
CPC ........... G06Q 20/401; G06K 9/03; G06K 9/18
See application file for complete search history.

(56) References Cited

U.S. PATENT DOCUMENTS

| | | | | |
|---|---|---|---|---|
| 8,126,806 B1 * | 2/2012 | DiMartino | ........... | G06Q 20/105 705/41 |
| 8,203,765 B2 | 6/2012 | Pandipati | | |
| 8,861,861 B2 * | 10/2014 | Barrett | ............... | G06K 9/00456 382/182 |
| 9,830,580 B2 * | 11/2017 | MacGregor | ............ | G06Q 20/10 |
| 2013/0129218 A1 * | 5/2013 | Barrett | ............... | G06K 9/00456 382/182 |
| 2013/0230246 A1 | 9/2013 | Nuggehalli | | |
| 2015/0095203 A1 | 4/2015 | Howe | | |
| 2017/0262826 A1 * | 9/2017 | Bulut | ................... | G06Q 20/202 |

OTHER PUBLICATIONS

Gingerly, "Scan Receipts & Track Expenses", screen shots of application in Google Play App Store, application last updated Jun. 2, 2014, 2 pages.
Handwallet Expense Manager, "Expense Tracker Recorder", screen shots of application in Google Play App Store, application last updated Aug. 27, 2013, 2 pages.
Smart Idea Inc., "Quick Money Recorder", screen shots of application in iTunes Store, application last updated Mar. 25, 2015, 3 pages.

* cited by examiner

*Primary Examiner* — Talia F Crawley
(74) *Attorney, Agent, or Firm* — Foley & Lardner LLP

(57) ABSTRACT

Systems, methods, and apparatuses for detecting, capturing, and tracking financial transactions are provided. A method of detecting, capturing, and tracking includes registering, by a user device, a virtual cash register with the user device, wherein the registration includes associating the virtual cash register with a financial account; detecting, by the virtual cash register via the user device, a potential financial transaction using at least one of paper and coin currency; extracting, by the virtual cash register via the user device, financial transaction data regarding the potential financial transaction; generating, by the virtual cash register, a report regarding the financial transaction data; and providing, by the virtual cash register, the report to a predefined location.

28 Claims, 6 Drawing Sheets

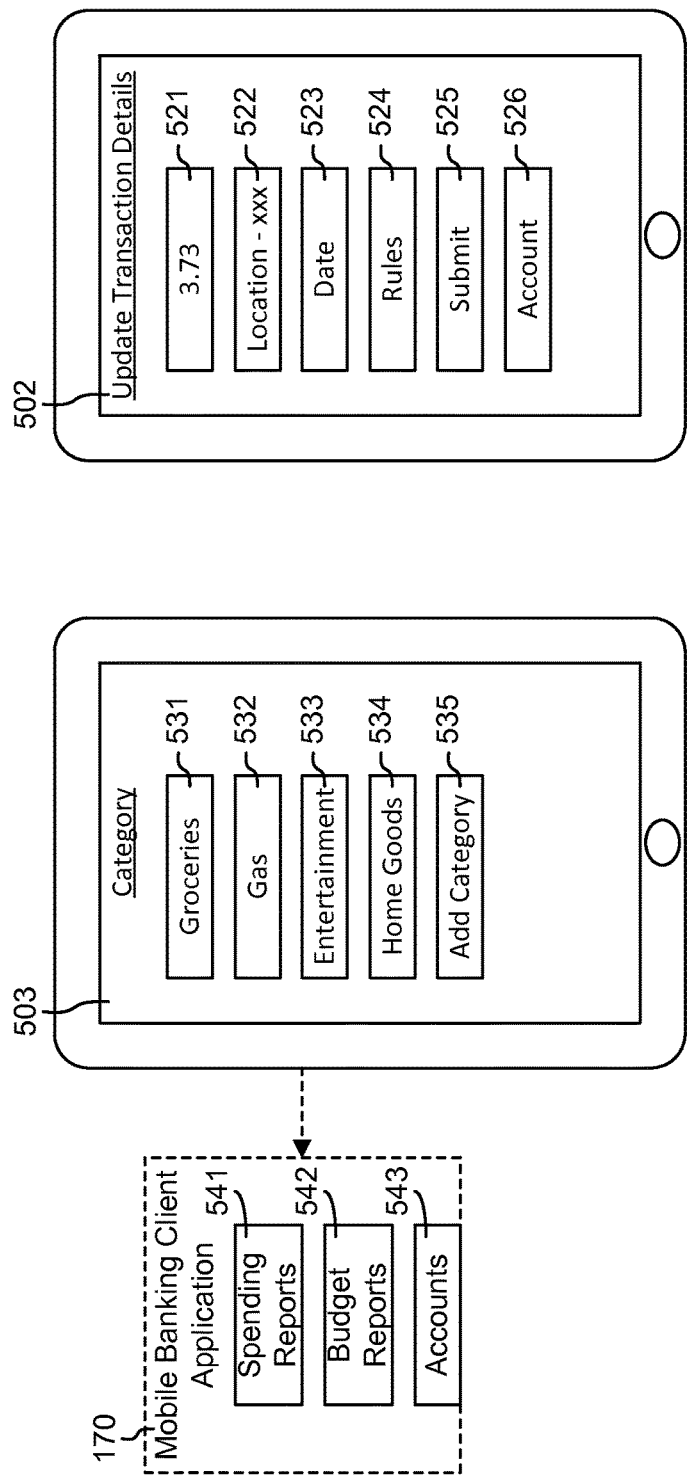
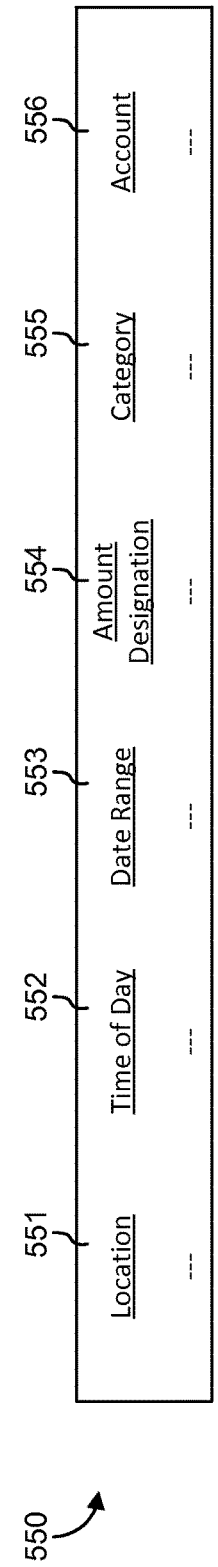
FIG. 5B
FIG. 5C

US 10,853,886 B1

SYSTEMS AND METHODS FOR A VIRTUAL CASH REGISTER

TECHNICAL FIELD

Embodiments of the present disclosure relate to tracking financial transactions. In particular, the embodiments of the present disclosure relate to providing systems, methods, and apparatuses for automated or mostly-automated tracking and managing of certain financial transactions.

BACKGROUND

Financial transactions refer to the exchange of currency and can be via any one of a number of different financial exchange protocol, such as credit cards, debit cards, checks, math-based currency, physical cash, and so on. Traditionally, physical cash-based transactions (e.g., coins, paper currency) dominated as the primary protocol type. With the advent of the Internet and networking capabilities, physical cash-based transactions began to give way to more digital transaction protocols. While credit/debit card financial exchange protocols are extremely popular, a relatively new form of financial exchange protocol has been developed and is rising in popularity—cryptocurrency or math-based currency.

While each financial exchange protocol may be used by customers and businesses alike based on the circumstances of the transactions, the large number and differing characteristics of each type can make tracking and management of financial transactions difficult. This may be exacerbated by users or companies who have accounts at a variety of different financial institutions. Another culprit is the physical-cash based transaction where a user input is necessary for tracking purposes. Accordingly, systems and methods for tracking financial transactions of all types and across a number of financial institutions are desired.

SUMMARY

A first example embodiment relates to a method of capturing a financial transaction. The method includes registering, by a user device, a virtual cash register with the user device, wherein the registration includes associating the virtual cash register with a financial account; detecting, by the virtual cash register via the user device, at least one of a potential financial transaction, an occurring financial transaction, and a past financial transaction; extracting, by the virtual cash register via the user device, financial transaction data regarding the at least one of the potential financial transaction, the occurring financial transaction, and the past financial transaction; generating, by the virtual cash register, a report regarding the financial transaction data; and providing, by the virtual cash register, the report to a predefined location.

Another example embodiment relates to a method of capturing a financial transaction. The method includes registering, by a user device, a virtual cash register with the user device, wherein the registration includes associating the virtual cash register with a financial account; detecting, by the virtual cash register via the user device, a potential financial transaction using at least one of paper and coin currency; extracting, by the virtual cash register via the user device, financial transaction data regarding the potential financial transaction; generating, by the virtual cash register, a report regarding the financial transaction data; and providing, by the virtual cash register, the report to a predefined location.

Another example embodiment relates to a device. The device includes a network interface configured to communicate with a financial computing system via a network; input/output logic for receiving data from an input/output component of the device associated with a user; and at least one processor communicably coupled to the input/output logic. The at least one processor is structured to: detect, via the input/output logic, a potential financial transaction; extract financial transaction data regarding the potential financial transaction; generate a report regarding the financial transaction data; and provide the report to the financial computing system via the network.

Yet another example embodiment relates to a device. The device includes a location positioning system structured to receive location data indicative of a location of the device of a user, and a virtual cash register implemented on the device. The virtual cash register includes: a registration module structured to facilitate registration of the virtual cash register with the device; a detection module structured to detect a fiat currency-based financial transaction based on the location data indicating that the device is at or near a merchant location; and a transaction module structured to extract financial data regarding the fiat currency-based financial transaction.

A further example embodiment relates to an apparatus. The apparatus includes a virtual cash register implemented on a device of a user. The virtual cash register includes a registration module of structured to facilitate registration of the virtual cash register with the device; a detection module structured to detect a fiat currency-based financial transaction at least partly using the device; and a transaction module structured to extract financial data regarding the fiat currency-based financial transaction with minimal input from the user.

These and other features, together with the organization and manner of operation thereof, will become apparent from the following detailed description when taken in conjunction with the accompanying drawings.

BRIEF DESCRIPTION OF THE FIGURES

FIG. 5B is a diagram of various screens of the virtual cash register application of FIG. 5A, according to an example embodiment.

FIG. 5C is a diagram of a rules engine screen of the virtual cash register application of FIGS. 5A-5B, according to an example embodiment.

DETAILED DESCRIPTION

Referring to the Figures generally, systems, methods, and apparatuses for tracking and managing financial transactions are described herein. According to the present disclosure, a virtual cash register is implemented with at least one user device. The user device can include a wearable type device, such as a smart watch or smart bracelet, and/or a mobile device, such as a smart phone or laptop computer. Generally, the virtual cash register, via a detection device of the user device (e.g., a microphone, camera, etc.), is structured to detect a financial transaction, extract details or information regarding the transaction, receive an accuracy confirmation regarding the details, and provide the details to a financial institution of the user for tracking and management purposes.

According to one embodiment, the financial transaction is a fiat currency-based financial transaction (e.g., paper currency and coins). In this regard, the virtual cash register may use one or more triggers (e.g., wake-up mechanisms) that signify the exchange of cash or the fiat currency-based financial transaction in general (e.g., a verbal trigger from a merchant to a user, such as "your total is $3.25") to begin extracting details regarding the transaction (e.g., the amount of cash received or provided, the location of the exchange, what was purchased, etc.). The virtual cash register stores the details regarding the transaction and selectively provides those details to a selected financial institution for tracking. The financial institution may integrate these details with details/information from digital transactions of a user (e.g., credit cards, debit cards, etc.) to better track financial transactions of the user. Further and beneficially, a user may with little or no input track details regarding their paper currency and coin transactions while substantially contemporaneously gaining the benefit of enhanced financial transaction tracking. These and other features, structures, benefits, and functions of the present disclosure are described herein below.

Figure 1:
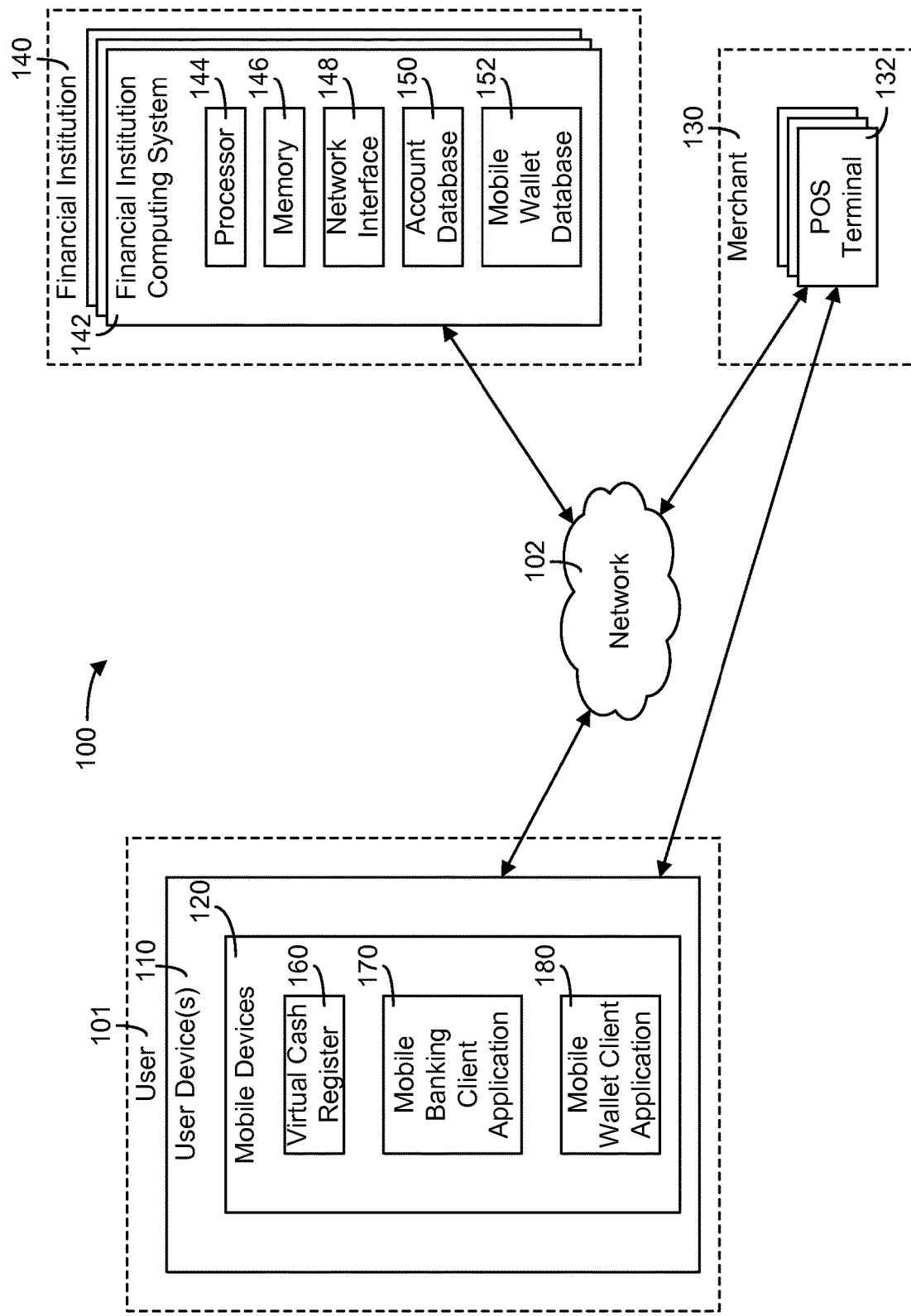
FIG. 1 is a diagram of a computing system according to an example embodiment.

Referring now to FIG. 1, a block diagram of a computing system 100 is shown according to an example embodiment. As described herein, the computing system 100 facilitates financial transaction tracking and management between a user 101 and a merchant 130. In certain embodiments, the computing system 100 also facilitates tracking and management of the accounts (e.g., checking, savings, etc.) of the user 101 held by the financial institution 140 in response to the tracking and management capabilities of the virtual cash register 160 described herein. In this regard and as shown, more than one financial institution 140 may be included with the computing system 100 to provide a relatively greater and holistic tracking and management capability for each of the accounts at each of the financial institutions of the user.

The computing system 100 generally includes a user device(s) 110 associated with a user 101 communicably coupled to at least one point-of-sale (POS) terminal 132 for at least one merchant 130 and at least one financial institution computing system 142 associated with at least one financial institution 140 over a network 102. The network 102 may be any type of type of network. For example, the network 102 may be a wireless network interface (e.g., 802.11X, ZigBee, Bluetooth, Internet, etc.), a wired network interface (e.g., Ethernet), or a combination thereof. The network 102 is configured to permit the exchange of data between and among the user device 110, POS terminal 132, and the financial institution computing system 142.

As shown, the financial institution 140 includes a financial institution computing system 142. The financial institution computing system 142 includes a processor 144 and memory 146. The processor 144 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 146 (e.g., RAM, ROM, NVRAM, Flash Memory, hard disk storage, etc.) may store data and/or computer code for facilitating at least some of the various processes described herein. In this regard, the memory 146 may store programming modules that, when executed by the processor 144, control the operation of the financial institution computing system 142. The financial institution computing system 142 includes a network interface 148. The network interface 148 facilitates the sending and receiving of data over the network 102 (e.g., to and from the merchant POS terminal 132, to and from the user device 110, etc.). The financial institution computing system 142 includes an account database 150 that stores customer information and account information relating to accounts held with the financial institution 140 of the user. In this regard and as mentioned above, more than one financial institution 140 with an associated financial institution computing system 142 may be communicably coupled to the components of FIG. 1 over the network 102 to account for accounts held by the user by two or more financial institutions.

As shown, the financial institution computing system 142 also includes a mobile wallets account database 152 for storing mobile wallet accounts of users. As described herein below, the mobile wallet accounts may permit payments via the mobile wallet client application 180.

The merchant 130 may include any type of merchant who may be a party to a financial transaction. Thus, the merchant 130 may include a physical store (e.g., restaurant, entertainment store such as a movie theater, grocery store, hardware store, pub/bar, mall location, gas or fueling station, etc.), an individual selling items (e.g., off of a street, etc.), an online vendor, and so on. The merchant 130 is also shown to include a point of sale (POS) terminal 132. As mentioned above, a financial transaction refers to the receiving and/or providing of currency and can be via any one of a number of different financial exchange protocol, such as credit cards, debit cards, checks, math-based currency, physical cash, etc. In this regard, the financial transaction may occur over the network 102 (e.g., as an online sale, etc.) and/or in a physical location (e.g., a brick and mortar location). Accordingly, the POS terminal 132 may include any type of point-of-sale terminal. For example, for online purchases, the POS terminal 132 may include a website or an application that processes and facilitates a financial transaction. In another example, for a physical location, the POS terminal 132 may include a cash register and/or a card reader (e.g., a credit/debit card scanner, etc.).

The user 101 may be a customer or party to the financial transaction with the merchant 130. Accordingly, the user 101 may include individuals, business representatives, large and small business owners, etc. The user 101 may have a financial account at one or more of the financial institutions 140 of the system 100.

As shown, the user 101 may also have or be associated with a user device 110. The user device 110 may be generally described as a mobile device 120. The mobile device 120 may include any wearable device of the user. Wearable devices refer to any type of device that a user wears including, but not limited to, a watch (e.g., a smart watch), glasses (e.g., eye glasses, sun glasses, smart glasses, etc.), bracelet (e.g., a smart bracelet), etc. Mobile devices 120 may also include any type of mobile device of a user 101 including, but not limited to, a phone (e.g., smartphone, etc.)

and a computing device (e.g., tablet computer, laptop computer, person digital assistant, etc.).

In this example, the user device 110 includes a virtual cash register 160, a mobile banking client application 170, and a mobile wallet client application 180. The virtual cash register 160, mobile banking client application 170, and mobile wallet client application 180 may be server-based applications executable on the user device 110. In this regard, a user may have to first download the application(s) prior to their usage. In another embodiment, the virtual cash register 160, mobile banking client application 170, and mobile wallet client application 180 may be hard coded into the memory of the user device 110. In still another embodiment, the virtual cash register 160, mobile banking client application 170, and mobile wallet client application 180 may be a web-based interface application. In this instance, the user may have to log onto or access the web-based interface before usage of the application(s). In this regard, at least one of the virtual cash register 160, mobile banking client application 170, and mobile wallet client application 180 may be supported by a separate computing system comprising one or more servers, processors, network interface modules, etc. that transmit the applications for use to the user device 110. In certain embodiments, the virtual cash register 160, mobile banking client application 170, and/or mobile wallet client application 180 may include an application programming interface (API) and/or a software development kit (SDK) that facilitate the integration of other applications with at least one of the virtual cash register 160, mobile banking client application 170, and mobile wallet client application 180. All such variations and combinations are intended to fall within the spirit and scope of the present disclosure. Further, while the virtual cash register 160, mobile banking client application 170, and mobile wallet client application 180 are shown as separate applications in FIG. 1, it should be understood that in other embodiments one of the virtual cash register 160, mobile banking client application 170, and mobile wallet client application 180 may be sub-applications of another application.

The mobile banking client application 170 is communicably coupled to the financial computing system 142 (e.g., the accounts database 152) via the network 102 and is structured to permit management of the user's accounts via the mobile banking client application 170. In this regard, the mobile banking client application 170 may provide displays indicative of current account balances, pending transactions, profile information (e.g., contact information), and the like. Further, in some embodiments, the mobile banking client application 170 may also permit payments from the user 101 to a designated recipient. For example, the mobile banking client application 170 may depict a loan of a user (e.g., mortgage) and allow the user to pay the mortgage from one of their accounts (e.g., checking or savings). In another example, a bill pay option may be provided by the mobile banking client application 170, where the bill pay option allows the user 101 to pay his/her bills.

The mobile wallet client application 180 is communicably coupled to the financial institution computing system 142 (e.g., the mobile wallets database 152) via the network 102 and is structured to facilitate purchases by the user via the mobile wallet client application 180. Accordingly, the mobile wallet client application 180 may be linked or otherwise connected with one or more accounts of the user. In operation, when at a POS terminal 132, a user may open the mobile wallet client application 180 and provide a passcode (e.g., biometrics such as a thumbprint, a personal identification number (PIN), a password, etc.) to authenticate the person and select the payment account desired (e.g., a checking account from a particular financial institution that is linked to the mobile wallet client application 180). Via communication with the payment terminal (e.g., near field communication), the aforementioned payment information is provided and the payment is processed. Beneficially, carrying payment cards may be avoided or reduced via the mobile wallet client application 180.

The virtual cash register 160 is structured to detect a financial transaction, extract data or information regarding the financial transaction, store the information regarding the financial transaction, and selectively provide the information to a predefined location, such as the financial institution computing system(s) 142, for complete or substantially complete financial tracking and management for the user 101. The structure and function of the virtual cash register 160 may be explained more fully in regard to FIG. 2.

Figure 2:
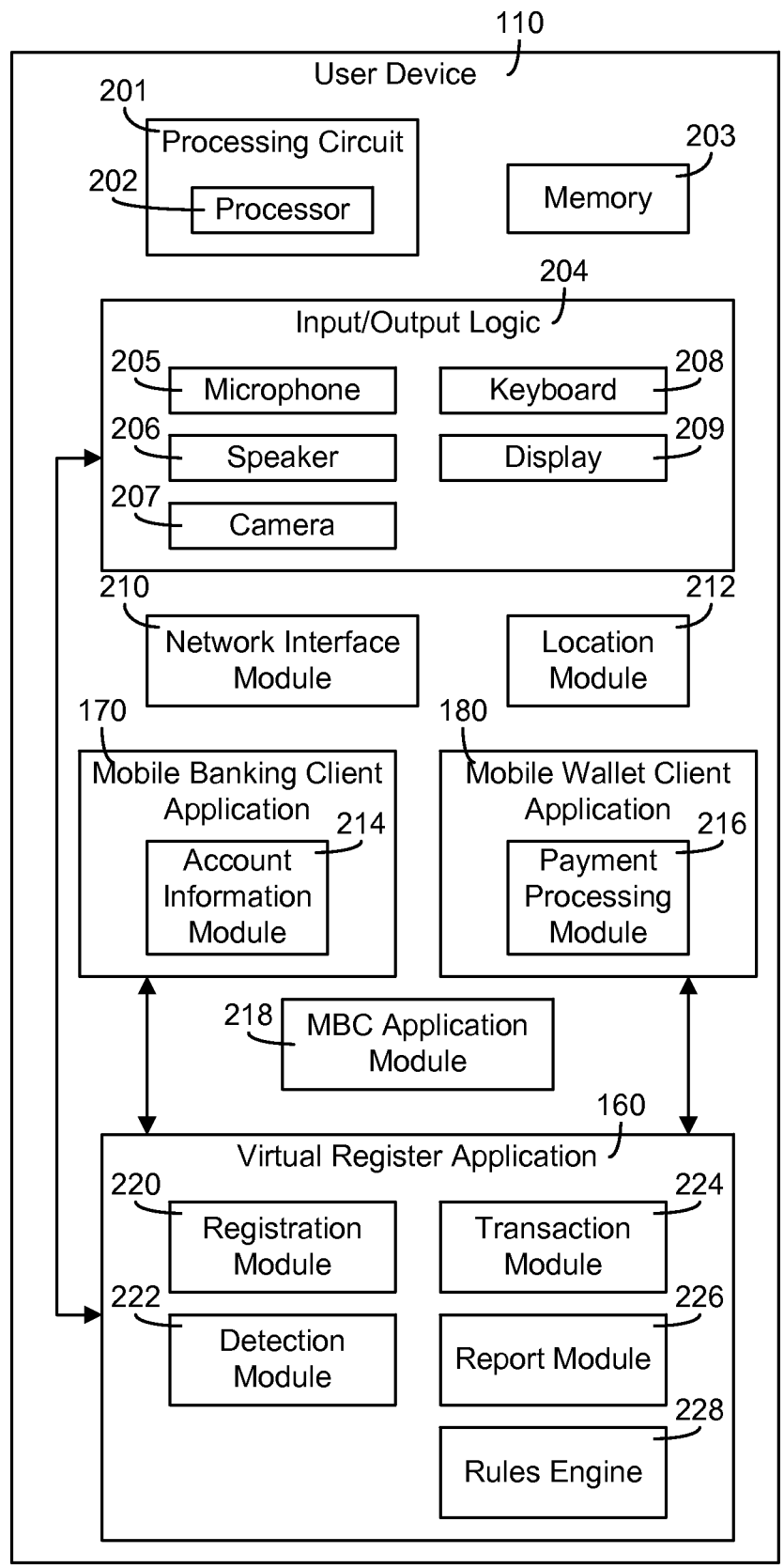
FIG. 2 is a diagram a virtual cash register implemented with a user device according to an example embodiment.

Accordingly, referring now to FIG. 2, the function and structure of the user device 110 with the virtual cash register 160, mobile banking client application 170, and the mobile wallet client application 180 is shown in greater detail according to an example embodiment. Before turning to the virtual cash register 160, the mobile banking client application 170, and mobile wallet client application 180 as shown in FIG. 2, the user device 110 also includes a processing circuit 201 having a processor 202 and a memory 203. The processor 202 may be implemented as a general-purpose processor, an application specific integrated circuit (ASIC), one or more field programmable gate arrays (FPGAs), a digital signal processor (DSP), a group of processing components that may be distributed over various geographic locations or housed in a single location, or other suitable electronic processing components. The one or more memory devices 203 (e.g., RAM, NVRAM, ROM, Flash Memory, hard disk storage, etc.) may store data and/or computer code for facilitating the various processes described herein. Moreover, the one or more memory devices 203 may be or include tangible, non-transient volatile memory or non-volatile memory. Accordingly, the one or more memory devices 203 may include database components, object code components, script components, or any other type of information structure for supporting the various activities and information structures described herein.

The user device 110 is shown to include various modules for completing at least some of the activities described herein. More particularly, the user device 110 includes input/output logic 204, a network interface module 210, a location module 212, a mobile wallet client application module 180, a mobile banking client application 170, and a virtual cash register 160. While various modules with particular functionality are shown in FIG. 2, it should be understood that the user device 110 may include any number of modules for completing the functions described herein. For example, the activities of multiple modules may be combined as a single module, as additional modules with additional functionality may be included, etc.

The network interface module 210 is adapted for and configured to establish a communication session via the network 102 with at least one of the financial computing system 142 and the merchant 130 (e.g., via the POS terminal 132). Accordingly, the network interface module 210 includes any of a cellular transceiver (e.g., CDMA, GSM, LTE, etc.), a wireless network transceiver (e.g., 802.11X, ZigBee, Bluetooth, etc.), or a combination thereof (e.g., both a cellular transceiver and a Bluetooth transceiver). Further, the network interface module 210 may include cryptography capabilities to establish a secure or relatively secure communication session with the at least one financial computing system 142 or another device of the user's choosing. In this regard, financial data (or other types of data) may be encrypted and transmitted to prevent or substantially prevent the threat of hacking.

The input/output logic 204 is structured to receive and provide communication(s) to a user of the device 110 (or, to another entity such as the POS terminal to facilitate mobile wallet payments). The input/output logic 204 may also be structured to exchange data, communications, instructions, etc. with an input/output component of the device 110. Thus, the input/output logic 204 may include one or more modules for communicating with the input/output devices of the user device 110. As shown, the input/output logic 204 includes a microphone module 205, a speaker module 206, a camera module 207, a keyboard module 208, and a display module 209. The microphone module 205 may include or be communicably coupled with a microphone or other audio capturing component of the device 110. The speaker module 206 may include or be communicably coupled with a speaker or other audio emitting component of the device 110. The camera module 207 may include or be communicably coupled with a camera or other image (moving or still) capturing component of the device 110. The keyboard module 208 may include or be communicably coupled with a keyboard of the device 110. Similarly, the display module 209 may include or be communicably coupled with a display of the device 110. As described herein below, the virtual cash register 160 may utilize one or more of these modules to detect a financial transaction and extract details regarding the financial transaction.

The location module 212 is structured to receive location data and determine a location of the user device 110 based on the location data. The location module 212 may include a global positioning system (GPS) or any other type of location positioning system. As such, the location module 212 may receive latitude data, longitude data, and any other type of location or position data to determine the location of the user device 110. In other embodiments, the location module 212 may receive location data from the merchant POS terminal 132 that indicates the location of the user device 110. In still other embodiments, the location module 212 may receive an explicit location identification from the user of the device 110. All such variations are intended to fall within the spirit and scope of the present disclosure.

As mentioned above, the mobile wallet client application 180 is structured to facilitate and permit payments by interfacing with an account (e.g., a checking account) held by the user at a financial institution 140. Accordingly, the mobile wallet client application 180 may be communicably coupled via the network interface module 210 over the network 102 to the financial institution computing system 142. Accordingly, the user device 110 may include a plurality of mobile wallet client applications for each account held at each different financial institution. As shown, the mobile wallet client application 180 may include a payment processing module 216 structured to facilitate payments by a user via the mobile wallet client application 180. For example, the payment processing module 216 may enable a quick-pay capability to a merchant. In this regard, the payment processing module 216 may include or be communicably coupled with a communication device (e.g., a near-field communication chip) that facilitates the exchange of information between the mobile wallet client application 180 and the POS terminal 132.

As mentioned above, via the mobile banking client application 170, the user may deposit checks, pay bills (e.g., mortgage, etc.), and otherwise manage their account (e.g., check the balance, etc.). Accordingly and as shown, the mobile bank client application 170 may include an account information module 214. The account information module 214 is linked or otherwise coupled to one or more accounts held by a user and permit management of the associated account (e.g., transfer balances between accounts, see payment history, etc.). The mobile banking client application 170 may also be communicably coupled to the mobile wallet client application 180. As such, in response to a mobile payment via the application 180, the application 180 causes the mobile banking client application 170 to update the payment account (i.e., the account that supported the mobile payment). As such, the mobile wallet and banking client applications 180, 170 may be communicably coupled to each other to enable actions supported by each respective application.

The math-based currency (MBC) application module 218 is structured to facilitate math-based currency financial transactions. MBC, also and often referred to as cryptocurrency, uses cryptography to create, secure, and transfer MBC directly from a first user to a second user instead of passing a fiat currency (i.e., currency that is declared by a government to be legal tender). The MBC application module 218 is structured to track, manage, and facilitate MBC currency financial transactions. Examples of MBC applications supported by the MBC application module 218 include, but are not limited to, Bitcoin, Ripple, Litecoin, Peercoin, and Dogecoin.

With the above in mind, an example structure for the virtual cash register 160 is shown in FIG. 2. The virtual cash register 160 is shown to include a registration module 220, a detection module 222, a transaction module 224, a report module 226, and a rules engine module 228. Other embodiments may include more or less modules without departing from the spirit and scope of the present disclosure. The virtual cash register 160 is structured detect financial transactions with little to no input by the user and automatically or substantially automatically update or facilitate updating of one or more financial accounts of a user. In one embodiment, the financial transaction is fiat currency including paper currency and coin transactions. In comparison, digital financial transactions may refer to credit or debit card transactions, mobile wallet transactions, and the like. Details of the digital transactions may be readily captured. However, the same is not true for fiat currency transactions that often require manual input of the details of the transaction. For example, a user may withdrawal $100 from an automated teller machine and proceed to spend the $100 at a variety of merchant locations (e.g., grocery store, pub, hardware store, fueling station, etc.). To keep track of these individual transactions, the user would have to assemble or otherwise keep track of each transaction and then log those transactions into a record keeping book, such as the mobile banking client application 170. This process is time-consuming, tedious, and undesirable. Accordingly, the virtual cash register 160 is structured to detect and record fiat currency-based financial transactions with little to no input from the user.

The registration module 220 is structured to facilitate user registration with the virtual cash register 160. The registration module 220 is structured to facilitate registration of the virtual register application 160 with at least one user device 110. Registration may also include linking or integrating one or more financial accounts with the virtual register 160. Registration may also include linking or integrating the virtual register 160 with a mobile wallet of the user (e.g., the mobile wallet client application 180). Registration may further include linking or integrating the virtual cash register 160 with an account of the user via the mobile banking client application 170. Registration may still further include designation of one or more system preferences regarding the virtual register 160. The system preferences may include a security preference, a usage preference, and so on. The security preference may define the requirements needed before the virtual cash register 160 functions. For example, a user may have to provide a password (e.g., word, phrase, alphanumeric value, biometric scan, etc.) before the virtual cash register 160 is active. The usage preference may define when the virtual cash register 160 is active. For example, the usage preference may be "always-on", always-on when not being charged, only on when the user explicitly activates the virtual cash register, etc. The system preference may also include an extraction and/or detection preference. The extraction and/or detection preference may define which one or more of the extraction processes and detection processes described herein below are utilized and when. Thus, the system preferences may largely define operation of the virtual cash register 160 and can be highly configurable from application-to-application.

The detection module 222 is structured to detect a financial transaction. As mentioned above, in one embodiment, the financial transaction is a fiat currency transaction. Detection of the fiat currency transaction may be via any one or more of a number of different wake-up mechanisms. Because digital financial transactions can be readily captured by an accounting tool of the user, the detection module 222 is described herein below in regard to fiat currency-based financial transactions. To achieve full autonomous detection or nearly full autonomous detection of the fiat currency-based transaction, the detection module 222 may be communicably coupled with one or more input/output devices or associated modules (e.g., speaker module 206) to use various trigger mechanism to detect the transaction. In this regard, the virtual cash register 160 is applicable and adaptable to the particular device 110. For example, if the device includes a microphone and not an image capturing device, the wake-up mechanism (described below) may be limited to verbal cues of the financial transaction. This capability provides a beneficial modularity to the virtual cash register 160.

A wake-up mechanism refers to a trigger or cue for detecting or identifying at least one of a potential financial transaction, an occurring financial transaction, and a recently occurred or past financial transaction. Accordingly, the wake-up mechanism may include a verbal cue. The verbal cue may be detected by a microphone of the user device 110 and include or be based on one or more predefined words, phrases, and the like. For example, any time the phrase "that will be [insert amount here] dollars" is uttered, the detection module 222 may detect or suspect that a fiat currency-based transaction is occurring. In another example, the verbal cue may be specific to the user and include one or more predefined cues that, e.g., indicate the start and stop of the financial transaction. For example, the user may verbally designate the start of a financial transaction (e.g., "I am about to check-out now."; "will that be cash or charge?"; etc.) to awaken the virtual cash register 160 and begin financial data extraction (described below). While the first example is substantially without user input, the second example may utilize user input. The verbal cue may be specific to a user of the user device 110. In this regard, voice recognition processes may be included with the detection module 222. Beneficially, this may limit financial transaction detection to only instances where the user speaks, such that financial transactions of others nearby are not captured. Of course, the demarcation of verbal cues can vary widely (e.g., any time "cash", "coins", "dollars" are uttered, etc.), such that the aforementioned examples are not meant to be limiting.

A wake-up mechanism may also include a visual cue. Visual cues may be detected by the camera of the user device 110 and may include one or more predefined moving or static images. For example, a person wearing smart eyeglasses may walk into a hardware store, where the hardware store image (e.g., name or logo) is captured by the camera. Using either recognition processing, a matching process based on pre-identified names or logos, or some combination therewith, the detection module 222 may determine that the user is within a store and determine that there is a potential of a financial transaction. Detection of the actual financial transaction then may occur using other visual cues, audio cues, and/or location cues (e.g., the user saying "I am about to check out now."). The visual cue may also include an image of an employee name tag, which may indicate that the user is in a store. The visual cue may also include at least one of a card reader and a physical cash register, which may indicate that the user is in a store and in proximity near a checkout location of that store. The visual cue may also include a cart being pushed by the user (e.g., a shopping cart), which may indicate that the user is shopping and there is a potential for a financial transaction. The visual cue may further include an image of a receipt, a screenshot of a financial transaction (e.g., on a cash register), and so on.

Another wake-up mechanism may include a location cue. A location cue may be used to determine that the user is at or near a merchant location. Depending on the sophistication of the location cue, the location cue may also indicate that the user is at or near the POS terminal of the merchant location. The location cues may be provided via the location module 212 and include latitude and longitude data. The location data may be used to determine the location of the user and whether any merchants are in a predefined vicinity of the user so to cause detection of a potential financial transaction. Similar to the visual cues, the location cues may indicate that the user is in a store or a merchant location, an impending financial transaction, and/or a potential for a financial transaction (e.g., based on the physical location of the user). In this regard, the location cue may be provided by the location module 212, wherein the location data confirms that the user is in a merchant location. In this regard, the potential financial transaction may be confirmed. If the location data indicates that the person is not near a merchant location, the virtual cash register 160 may stop listening because there is a greater likelihood that no transaction is about to occur. Of course, in other embodiments, the virtual cash register 160 may continue to listen even if the location data indicates that the person is not near a merchant location.

In one embodiment, the detection module 222 may confirm that a potential for a financial transaction does not exist based on the user's location (or the location of the device of the user) relative to a merchant's location. For example, the location module 212 may indicate that the user is more than five-hundred feet from the nearest merchant. As such, the detection module 222 may determine that no potential financial transaction exists. Accordingly, a user may predefine a distance threshold relative to a merchant location, wherein if the user device is within that distance threshold the potential for a financial transaction is confirmed. If the user device is outside of that distance threshold, the potential for a financial transaction is denied. Using the location module 212, the aforementioned process may be used to strategically awaken the virtual cash register 160 to prevent an always-on mode that may be draining on the battery of the device 110.

The above wake-up mechanisms refer to internal wake-up mechanisms (e.g., stemming from detection via one or more components on or included with the user device 110). However, in other embodiments, external wake-up mechanisms may also be utilized by the detection module 222 to detect a financial transaction, a potential financial transaction, or a past financial transaction. External wake-up mechanisms refer to cues received by the detection module 222 via an external source (e.g., the financial computing system 142, the merchant 130, etc.). For example, cash registers at merchant stores may include a sensor for detecting an IP address of a mobile phone (e.g., using NFC, Bluetooth, etc.). When the cash register attempts to communicate with the mobile phone, the detection module 222 may readily identify an impending potential financial transaction. In another example, an external cue may be via detection of a user at or near a merchant's location via the merchant's devices (e.g., a camera that recognizes the user from previous trips, a user logging onto the merchant's WiFi to recognize the user, etc.). In another example, the merchant may broadcast or transmit a merchant category code. The merchant category code may be used to identify the merchant and category of purchase regarding the merchant (e.g., home goods). As such, the virtual cash register 160 may readily identify the user is in a merchant location, the identity of that merchant, and the category of purchase if the user makes a purchase at that location.

In operation, the detection module 222 may utilize any combination of external and internal wake-up mechanisms to detect a financial transaction. It should be understood that the present disclosure contemplates other wake-up mechanisms, both internal and external, that are intended to fall within the scope of the present disclosure.

Responsive to the detection of the financial transaction, the transaction module 224 is structured to extract information or data regarding the transaction, referred to as financial transaction data. The financial transaction data may include, but is not limited to, a transaction location, a product or service purchased, currency exchanged (e.g., cash-in, cash-out, cash spent), a time of the transaction, a category of the transaction (e.g., groceries, hardware stores, entertainment such as a movie theater, etc.), merchant information (e.g., name, location, etc.), etc.

The transaction module 224 may use any one of a number of different extraction processes to extract the financial transaction data. An extraction process may include image deciphering. For example, a camera on the user device may scan or take an image of a receipt associated with a financial transaction to extract what was purchased, the cost of each purchase, the time of the purchase, the location of the purchase, and so on.

An extraction process may also include audio deciphering. Audio deciphering may include recording the conversation between the user 101 and the merchant to gather the details of the transaction. In some embodiments, the conversation may be recorded and stored in the memory for future analysis. In this regard, a user may double-check the accuracy of the extracted financial transaction data based on listening to their original conversation.

Another extraction process may be via a combination of image and audio deciphering. For example, the image taken of the cash financial transaction receipt may only partly show the total cash expenditures (i.e., be incomplete) but the merchant may have audibly said the total. In this instance, the transaction module 224 may combine the image data with the audio data to assemble and extract a relatively more complete set of transaction data regarding the financial transaction.

It should be understood that the aforementioned extraction processes are not meant to be limiting as the present disclosure contemplates other and different kinds of extraction processes that may be utilized by the transaction module 224 to extract the financial transaction data. For example, another extraction process may be receiving the financial transaction data from an external source. As an example, the merchant's cash register or computing system that is communicably coupled to the cash register may broadcast the details of the financial transaction data to the virtual cash register 160. The virtual cash register 160 may then categorize and assemble the provided financial transaction data for tracking and management purposes.

The transaction module 224 may also be structured to provide the transaction data or a summary thereof to the user and receive an accurate or inaccurate confirmation. The transaction data may be provided as a message on the user device (e.g., text message, email, push notification, etc.), a voice call (e.g., from a robo-dialer included with the virtual register 160), a display icon, and/or via any other means. In certain embodiments, the financial transaction data may even be provided to a second device (e.g., a device separate from the device used to do the detection and extraction). For example, a user may request that their transactions be tracked and passed or transmitted to a different device (e.g., a desktop computer) where they can confirm or deny the accuracy of the data at a later date and time. In this regard, the virtual cash register 160 still largely captures financial transactions, particularly fiat currency-based transactions, with little or no input from the user. Further, the user need not manual enter the details of the transaction, substantially only revisionist details (e.g., corrections, deletions, additions) relative to the provided transaction data. By providing the details/information to a second different device, an added layer of security regarding the transactions may be provided by the virtual cash register 160.

The transaction module 224 may also be communicably coupled to the MBC application module 218. In other embodiments, the MBC application module 218 may be included with the virtual cash register 160. Accordingly, the transaction module 224 may also extract details regarding any MBC financial transaction. For example, the transaction module 224 may extract that the user just engaged in $9.27 transaction using Bitcoin or $3.45 in Peercoin, etc. The transaction module 224 extracts transaction data, also referred to as MBC transaction data, regarding the MBC transaction including, but not limited, location, date, time, etc.

Responsive to the confirmed accurate transaction data or independent thereof, the report module 226 is structured to assemble the financial transaction data, including the MBC transaction data if applicable, and compile the collective transaction data into one or more reports, such as a spending report, a ledger, a budget report, etc. The spending report may provide a graphical depiction of where the user spends their paper and coin currency. The budget report may provide a graphical depiction of how the user's fiat currency expenditures align with their budgetary goals. These reports may be provided to the mobile banking client application 170 or to the financial institution computing system 142 directly to assimilate or integrate the collective transaction data into one or more accounts, account management tools (e.g., a spreadsheet), and/or the like for easy management of their expenses and income. In other embodiments, a user manually enters their account information into the virtual cash register 160 (e.g., via the registration module 220 during the registration process) where the virtual cash register 160 itself manages and tracks one or more accounts for the user. For small businesses or budget conscious individuals, it may be important to accurately and efficiently track cash expenditures (e.g., cash-in, cash-out, etc.) to achieve better financial management and improve the financial performance of the business or individual. This process is shown and described in more detail in regard to FIGS. 5A-5C.

As described above, transaction data extraction may be performed by the transaction module 224 automatically or with little user input. Advantageously, this facilitates the tracking and management of financial transactions, particularly cash transactions, without the aforementioned tedious manual tracking processes described above. Further, the virtual cash register 160 of the present disclosure may utilize the existing components (e.g., microphone, speaker, camera, etc.) to avoid add-on features to implement the virtual register 160 with a user device 110.

As mentioned above, the virtual cash register 160 may facilitate the tracking the of fiat-currency based transactions (e.g., paper currency and coins), where the tracked information can be integrated into one or more accounting tools (e.g., a budget report, a spending report, etc.). To ease integration, the virtual cash register 160 may include a rules engine module 228. The rules engine module 228 is structured to automatically or nearly automatically identify and categorize the detected transaction according to one or more rules (e.g., guidelines, filters, etc.). The one or more rules may designate a categorization of the transactions and a tracking characteristic of the transaction. The categorization designation refers to a spending category. For example, all detected paper and coin transactions under $5.00 may be filtered to a "Miscellaneous" category. In this example, the user may have no particular concern in transactions under this amount. However, for paper and coin transaction above $5.01, the detected transactions are categorized. The categorization may be based on the payment recipient (e.g., by recipient and/or by category for the recipient such as entertainment, groceries, etc.). In comparison, the tracking characteristic may designate how the transactions are tracked with respect to an account(s) of the user. The rules can be configured to track the transactions based on any one or more of the amount, payment recipient, location, time of day, time of year, and so one of the financial transaction. In regard to the above example, detected paper and coin currency transactions between $5.01 and 10.00 may be allocated as an expense to a first account of the user while detected paper and coin currency transactions between $10.01 and up are allocated to a second account of the user for tracking purposes. As such, a user may readily place certain transaction costs into the accounts desired (e.g., business expenses need to be accounted for differently and are typically above $10.01, such that the general rule described above can work to allocate business expenses to the business account). Beneficially, a user may withdraw an amount of money, use that money, and have the fiat currency substantially properly allocated or tracked. Example rules engine logic and categorization rules are shown more fully in regard to FIG. 5C herein.

Figure 3:
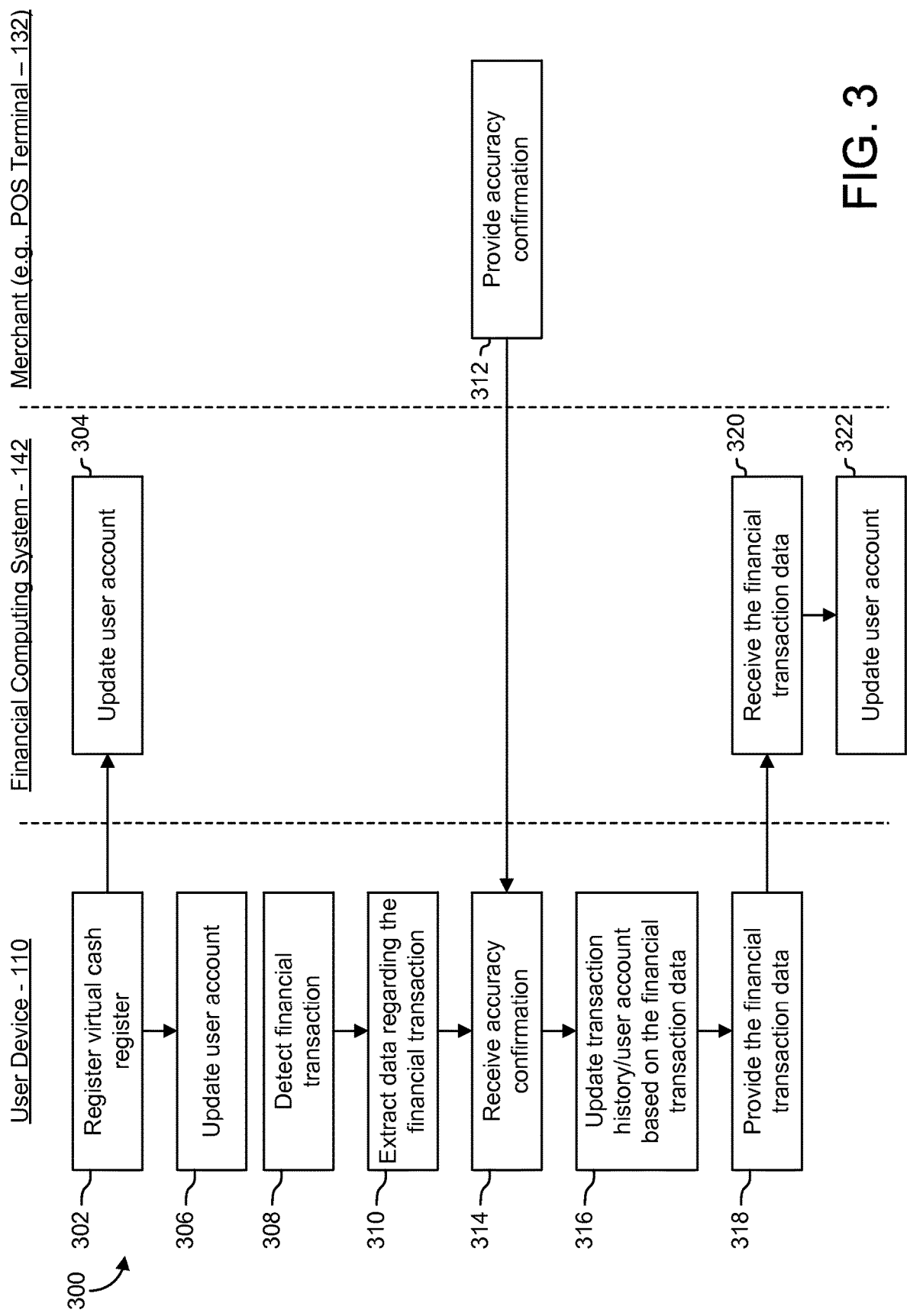
FIG. 3 is a diagram of tracking and managing financial transactions via the virtual cash register of FIGS. 1-2 according to an example embodiment.

Referring now to FIG. 3, a process of 300 of capturing, tracking, and managing financial transactions via a virtual cash register, such as the virtual cash register of FIGS. 1-2, is shown, according to an example embodiment. Because the process 300 may be implemented with the virtual cash register 160, reference may be made to other components of the computing system 100 to aid explanation of the process 300.

At process 302, the virtual cash register is registered. Registration may be done via the user device 110 to implement the virtual cash register with the user device 110. Registration may also be done via a central computing device (e.g., a home desktop computer) where a user then may indicate one or more other devices (e.g., laptop computer, tablet computer, smart phone, smart watch, smart eye glass, etc.) where they want the virtual cash register to be executed upon or embodied with. A user may then have to authenticate each chosen device before utilizing the virtual cash register 160. This two-step authentication process may be used to ensure or substantially ensure secure implementation of the virtual cash register. Registration may include supplying a username and password or passkey. In certain embodiments, the virtual cash register may require purchase or a subscription fee, such that the registration includes a payment for the virtual cash register. Registration may also include a linking process to one or more financial accounts held by the user at one or more financial institutions. As such, detected and captured transactions may be relatively seamlessly integrated with the one or more financial accounts.

At process 304, the financial account of the user is updated. The updating reflects the linking with the virtual cash register. This updating, linking, or registration integrates the virtual cash register with the user's financial institution(s). Of course, a user may selectively choose which financial institution is linked with the virtual cash register. For example, if they are a small business owner, they may only be concerned with tracking financial transactions associated with the business and not their own personal transactions. As such, during the registration process 302 in connection with the updating process 304, the small business financial account may be communicably coupled with the virtual cash register.

In some instances, a financial account of a user (e.g., a payment account for a specific store) may be held on the user device and supported by, e.g., a backend payment server associated with the specific store. In this regard, this financial account may be separate from financial accounts of a user held by a financial institution(s). Accordingly, via the registration process 302, the user may wish to track financial expenditures relative to this separate account. Thus, at process 306, this separate account, such as a mobile wallet account, or another account may be updated to reflect communicative coupling with the registered virtual cash register.

At process 308, a financial transaction is detected. As described above, the virtual cash register may detect a financial transaction, such as a fiat currency based transaction, via one or more wake-up mechanisms such as an audible cue, a visual cue, a location cue, some combination therewith, etc. Detection may be automatic or semi-automatic. Automatic refers to the financial transaction being detected without user input. Semi-automatic refers to the financial transaction being detected with minimal user input. For example, location data may indicate that the user is entering a store and subsequently that the user is near a cash register or check-out location. The virtual cash register may provide a message (e.g., a text message, an icon on a display screen executed by the virtual cash register application 160) asking the user to confirm that a financial transaction is about to occur.

Upon confirmation, at process 310, financial transaction data may be extracted from the financial transaction. As mentioned above, the financial transaction data refers to any type of data associated with the financial transaction including, but not limited to, a location, a date, a time, cash-in, cash-out, a duration of the transaction, a category of purchase or expenditure (e.g., grocery store, etc.), etc. The financial transaction data is stored and may be selectively provided to the user (e.g., on a display on the user device 110), to the other party of the transaction (e.g., the merchant 130), to a third party tracking agency, to the financial computing system 142, to another pre-selected device, etc.

At process 314, an accuracy confirmation is received regarding the extracted financial transaction data. The accuracy may be confirmed by the user at the user device 110 or by the merchant at process 312. In some embodiments, both the user and the merchant may need to confirm the accuracy of the financial transaction data before the financial transaction data or pieces thereof is integrated into the one or more reports. In other embodiments, as long as one of the user and the merchant confirm the accuracy of the financial transaction data, the financial transaction data or pieces thereof are integrated into one or more reports. While accuracy confirmation is broadly described above, it should be understood that accuracy confirmation includes adding, editing, and revising one or more pieces of the financial transaction data. For example, the financial transaction data may include the total cash spent but not the location of the transaction. The user may then input the merchant name and location. Based on the merchant name and location, the virtual register application 160 may update other pieces of financial transaction data, such as a category type if there are predefined relationships stored in the virtual cash register (e.g., via the rules engine module 228).

These predefined relationships or rules may be inputted during the registration process 302 and may include and are similar to, but are not limited to, any of the following: "if a purchase is made at Store X, the category of the purchase should be hardware"; etc. Another predefined relationship or rule may be used in tracking the financial transaction to achieve meet one or more budget or spending goals. For example, a user may specifically instruct the virtual cash register to round-up to the nearest dollar for each dollar spent (e.g., $2.05 to $3.00, etc.). As such, when a user looks at his or her spending report, it reflects money spent that is actually higher than in reality. This may function to perceive a higher spending than in actuality, which may function to curb spending by the user. Of course, there may also be a true amount spent that is used for accurate tracking with one or more financial accounts of the user. Accordingly, the predefined relationships or rules may be highly configurable for each application.

At process 316, the financial transaction history/one or more accounts are updated based on the confirmed accurate fiat currency financial transaction data. In this regard, the virtual cash register may store accounts of the user to update in real-time or near real-time each account based on each captured physical cash financial transaction. Periodically or at a user's discretion, the captured financial data may be assembled into one or more reports, such as the budgeting or spending reports, that is then provided to the financial computing system 142 for updating one or more financial accounts associated by the financial computing system 142 (process 318). In some embodiments, the accounts of the user held at the financial institution may be linked to the virtual cash register such that they are updated in real time or near real time following extraction and confirmation of accuracy of the financial transaction data.

At process 320, the financial computing system 142 receives the data regarding the financial transaction and at process 322, the financial computing system 142 updates an account of the user. In this regard, not all of a user's accounts may be linked to the virtual cash register. Accordingly, the updating for these accounts may be performed by the financial computing system itself for these accounts. As such, when a user accesses their accounts associated with a particular financial computing system, the user may view the updates caused by their recent cash transactions.

With the above process 300 in mind, an abbreviated example may be described as follows. A user registers the virtual cash register application including delineating cues for detecting fiat currency-based transactions. The user walks into a merchant store where, based on the provided cues, the virtual cash register identifies a potential for a financial transaction based on location data that indicates that the user is in the merchant store. The virtual cash register then detects a fiat currency transaction via one or more audible and/or visual cues, such as a merchant speaking a phrase like "your total is $9.27." The virtual cash register then begins extracting data regarding the transaction. At some point in time, the data is confirmed to be accurate and the data is used to update one or more accounts of the user. The accounts may be financial accounts held by a financial institution and/or a specific store payment account (e.g., a Starbucks payment card, etc.). Beneficially, the fiat currency financial transactions are tracked with no to minimal input from the user and integrated with other transaction information.

Figure 4:
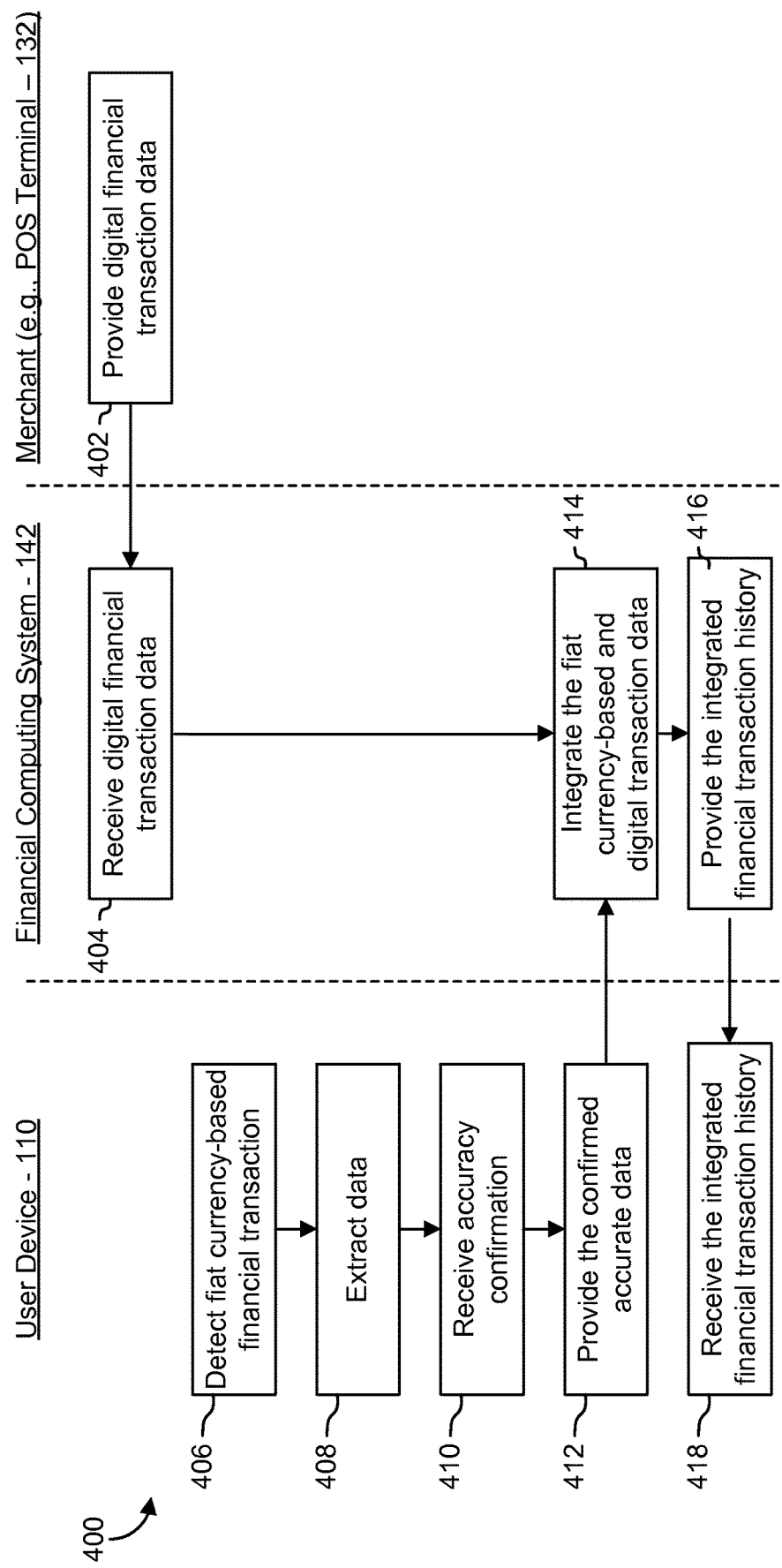
FIG. 4 is a flow diagram of a method of integrating fiat currency financial transactions with digital financial transactions according to an example embodiment.

Referring now to FIG. 4, a process 400 of assimilating or integrating fiat currency financial transactions with digital transactions is shown according to an example embodiment. As mentioned above, fiat currency financial transactions refer to financial transactions utilizing paper currency and coins, where the fiat currency may include both domestic (e.g., U.S.A.) and foreign currency (e.g., Chinese Yen, etc.). In comparison, digital financial transactions refer to financial transactions that utilize non-cash currency including, but not limited to, credit cards, debit cards, checks, mobile wallet applications, MBC financial transactions, etc.

At process 402, digital financial transaction data is provided and received (process 404) by a financial computing system. The digital transaction data may be integrated into one or more reports (e.g., credit card statement, demand deposit account, etc.) associated with the type of transaction (e.g., credit card, debit card) or any other type of categorizing piece of data.

At process 406, a fiat currency-based financial transaction is detected by a virtual cash register, such as the virtual cash register 160. Prior to detection, the virtual cash register may be register on a user device and predefined wake-up mechanisms use for detection defined. In other embodiments, detection may be based on default wake-up mechanism (e.g., verbal cues such "dollars", "cash", "your total is", etc.).

At process 408, data regarding the fiat currency-based financial transaction is extracted. As described above, extraction may be via one or more extraction processes, such as image deciphering, audio deciphering, a combination therewith, etc.

At process 410, an accuracy confirmation regarding the extracted data is received. The accuracy confirmation may be received by at least one of the user and the other party to the transaction (e.g., a merchant). In certain embodiments, this process or step may be omitted. In this configuration, a user may edit, confirm accuracy, etc. the extracted data at a later point in time. For example, after the extraction data is integrated with the digital financial transaction data and the user subsequently accesses their accounts held by the financial institution, the user may revise one or more pieces of the extracted data. In this instance, detection of the fiat currency-based transaction is largely without user input while the user is still provided the opportunity to view and confirm the details for relatively accurate accounting.

At process 412, the extracted data is provided to and received by the financial computing system. In one embodiment, the only pieces of extracted data that are provided to the financial computing system are those that are confirmed accurate. In another embodiment, all or pre-selected pieces of the extracted data are provided to the financial computing system without an accuracy confirmation. Providing the extracted data may at predefined intervals (e.g., after every detected transaction, monthly, weekly, etc.).

At process 414, the extracted data is integrated with the digital transaction data. In this regard, the financial computing system integrates all or mostly all of the of the financial transactions and the details associated therewith. Additionally, the financial computing system may generate one or more reports based on the integrated data. In other embodiments, the virtual cash register 160 or mobile banking client application 170 may generate one or more reports based on the integrated data. The reports may diagram where cash transactions occur versus digital transactions, the amounts spent in each type of transaction, general spending expenditures on various categories of items (e.g., hardware, vehicle fuel, groceries, entertainment, etc.), and so on.

At processes 416-418, the integrated data may be provided by the financial computing and received by the user device. As mentioned above, this data may be received by a mobile banking client application that either generates one or more reports, updates the one or more reports, and/or to provides the one or more reports to the user. In other embodiments, processes 416-418 may be excluded from the method 400. This modified process 400 may be used to reduce the amount of confidential data that is transmitted. In this regard, a user may only or substantially only access the integrated accounts from a portal provided by the financial computing system (e.g., via an online banking interface supported by the financial computing system, etc.).

Figure 5A:
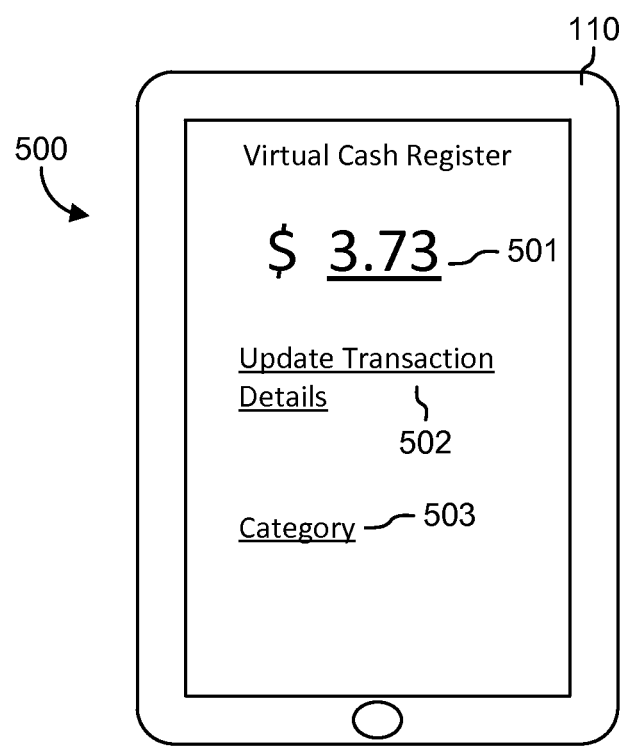
FIG. 5A is a diagram of a virtual cash register application on a user device according to an example embodiment.

Referring now to FIGS. 5A-5C, example images (e.g., screenshots) regarding the implementation of the virtual cash register 160 on a mobile device, shown as a mobile phone, are depicted according to various example embodiments. More particularly, FIGS. 5A-5C depict post-financial transaction detection images provided and generated by the virtual cash register 160. In FIG. 5A, a depiction 500 of a user device 110 having a display illustrating the extracted transaction details is shown according to an example embodiment. In this example, the virtual cash register 160 has detected a fiat currency transaction amount 501 of $3.73. In addition to displaying the amount 501, the virtual cash register 160 may also provide the user an ability to update the transaction details 502 and categorize 503 the transaction. As shown, links are provided with each of the amount 501, details 502, and category 503 to cause generation of another window(s) to achieve observation and/or modification of the transaction details.

FIG. 5B depicts expanded category 503 and update 502 windows on the user device 110, according to example embodiments. As shown, each window—category 503 and update 502—is a separate window on the device 110. However, in other embodiments, each of these windows 502, 503 may be provided on a single screen on the device 110. The category 503 window enables designation of the transaction in one or more categories (if the transaction has not otherwise been categorized based on the rules engine 228). The categories are shown to include, but are not limited to, a groceries 531 category, a gas 532 category, an entertainment 533 category, a home goods 534 category, and an add category 535 feature that enables the user to define a category. In this regard and generally speaking, the category 503 feature represents a general indication of the purpose of the expense.

As also shown in FIG. 5B, an update window 502 is illustrated on the user device 110 according to an example embodiment. The update window 502 is structured to facilitate observation and revision of one or more of the extracted transaction details. In this regard, the user may adjust the amount 521 of $3.73 of the transaction, may designate the location 522 of the transaction, may designate the date 523 of the transaction, may designate one or more rules 524 (e.g., via the rules engine 228), and submit 525 the updated transaction details once finished. While the term "designate" is used above to allow a user to manually input the details, in other embodiments, these fields (as well as others) may be populated via one or more components on the user device 110. For example, the location 522 field and date 523 field may be populated via a location positioning system on the mobile device (e.g., the global positioning system) and an internal clock system also included with the mobile device, respectively. As such, a user may simply observe the transaction details and modify various details as desired.

Further, as also shown in FIG. 5B, a designated account 526 field may also be included with the update window 502. The designated account 526 field facilitates the designation of the account(s) (e.g., demand deposit account) that the user wants to track and associate with their detected financial transactions. As such, a user may classify certain detected financial transactions as costs with respect to one or more designated accounts.

In this regard and as mentioned above, the extracted data may be provided to the mobile banking client application 170. The mobile banking client application 170 may update a spending report 541, budget report 542, one or more accounts 543, and otherwise integrate the extracted information into the user's other spending activity. In operation, for example, rather than simply showing a $100 cash withdrawal at an ATM, the user may i) see the details as to how the money was spent and/or ii) adjust the details/information of the detected financial transaction(s).

As mentioned above, the rules engine module 228 may facilitate automatic classification (e.g., tracking and categorization) of the detected financial transactions. An example rules engine window 550 is shown in FIG. 5C. The window 550 enables the user to classify how the transaction cost is accounted for based on the details of the transaction. As shown, a user may define a location 551, a time of day 552, a date range 553, and an amount designation 554. These fields represent how transaction amounts are classified into categories 555 and tracked with respect to one or more accounts 556 (e.g., check accounts, savings accounts, etc.). For example, a user may designate that all purchases at Location X are classified into Category Y and Account Z. In another example, for amount designations 554 between $0.01 and $10.00 are tracked with respect to Account A and amount designations 554 greater than $10.01 are tracked with respect to Account B. In still another example, a combination of predefinitions may be used (e.g., for Location A from March $1^{st}$ to May $19^{th}$ each year, the amount is tracked with respect to Account A whereas at all other times during the year, the detected amount is tracked with respect to Account B).

Based on the foregoing, an example process may be described as follows. A user may define that all detected fiat currency transactions from Store X are tracked with respect to Account A and that all detected fiat currency transactions from Store Y are tracked with respect to Account B. The user enters Store X, where Store X is identified based on the global positioning system from the user's mobile device. The user obtains a good sold by Store X and takes that good to the point of sale terminal at Store X. In response to the cashier asking "how would you like to pay for that today?", the virtual cash register on the user's mobile device is awoken. Via the speaker on the user's mobile device, the virtual cash register ascertains that the user has provided $10.00 for the good that cost $7.75. Accordingly, the virtual cash register has determined that the user spent $7.75 at Store X. Based on the predefined rule, the $7.75 cost is tracked with respect to Account A. This update with Account A may then be provided to the mobile banking client application 170 to update the user's budget and/or spending reports. In another embodiment, a link may be directly provided with the virtual cash register such that the update to Account A occurs in real time or near real time. Beneficially, the user may track fiat currency expenses with respect to designated accounts to and categories (e.g., gas/fuel costs, groceries, entertainment, etc.) with little to no input.

The above-described systems and methods provide for capturing, tracking, and managing financial transactions, particularly cash-based financial transactions, and subsequently integrating the details of those cash-based transactions with other digital transactions with little to no user input. While conventional tracking of cash-based transactions require laborious and time-consuming user input, the systems, methods, and apparatuses of the present disclosure substantially alleviate these shortcomings and improve the financial management processes employed by users or parties to the transaction.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings. The present embodiments contemplate methods, systems and program products on any machine-readable media for accomplishing its operations. The embodiments of may be implemented using an existing computer processor, or by a special purpose computer processor incorporated for this or another purpose or by a hardwired system.

As noted above, embodiments within the scope of this disclosure include program products comprising non-transitory machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments may be practiced in a networked environment using logical connections to one or more remote computers having processors. Those skilled in the art will appreciate that such network computing environments may encompass many types of computers, including personal computers, hand-held devices, multiprocessor systems, microprocessor-based or programmable consumer electronics, network PCs, minicomputers, mainframe computers, and so on. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the embodiments might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method of capturing a financial transaction, the method comprising:
    registering, via a user device, a virtual cash register with the user device, wherein the registration includes associating the virtual cash register with a financial account;
    receiving, by the virtual cash register via the user device, at least one of an audio cue and a visual cue;
    determining, by the virtual cash register via the user device, that the at least one of the audio cue and the visual cue corresponds to a trigger indicating a potential financial transaction using at least one of paper and coin currency;
    initiating, by the virtual cash register, an extraction process responsive to the trigger, the extraction process comprising:
        receiving audio data using an input component of the user device; and
        extracting, by the virtual cash register via the user device, financial transaction data regarding the potential financial transaction from the audio data using an audio deciphering process that deciphers sounds in the audio data that correspond to the financial transaction data;
    generating, by the virtual cash register, a report regarding the financial transaction data corresponding to the audio data; and
    transmitting, by the virtual cash register, the report to a remote computing device.

2. The method of claim 1, wherein the determining that the at least one of the audio cue and the visual cue corresponds to the trigger indicating the potential financial transaction is performed automatically by the virtual cash register via the user device without user input.

3. The method of claim 1, wherein the trigger is determined based on the audio cue.

4. The method of claim 3, wherein the input component of the user device includes an audio receiving device, and receiving the audio cue includes receiving, by the audio receiving device of the user device, at least one of a word and a phrase indicative of the potential financial transaction.

5. The method of claim 3, wherein the trigger is determined based on the visual cue, the input component of the user device includes an image capturing device, and receiving the visual cue includes receiving, by the image capturing device of the user device, at least one of a still image and a moving image indicative of the potential financial transaction.

6. The method of claim 1, wherein determining that the at least one of the audio cue and the visual cue corresponds to the trigger indicating the potential transaction further comprises:
    identifying, by the virtual cash register via the user device, location data indicative of a geographical position of the user device;
    determining, by the virtual cash register via the user device, that the user device is located at or near a merchant location, based on the location data indicative of the geographical position of the user device; and
    determining, by the virtual cash register via the user device, that the at least one of the audio cue and the visual cue corresponds to the trigger for the potential transaction based at least in part on the determination that the user device is located at or near the merchant location.

7. The method of claim 1, wherein the user device includes at least one of a smart eyeglass, a smart watch, and a smart bracelet.

8. The method of claim 1, wherein the remote computing device includes at least one of a display screen of the user device or a financial computing system associated with the financial account.

9. An apparatus, comprising:
    a virtual cash register implemented on a device of a user, the virtual cash register having:
        a registration module structured to facilitate registration of the virtual cash register with the device;
        a detection module structured to:
            receive at least one of an audio cue and a visual cue;
            determine that the at least one of the audio cue and the visual cue corresponds to a trigger indicating a fiat currency-based financial transaction; and
            receive audio data using an input component of the apparatus; and
        a transaction module structured to extract financial data regarding the fiat currency-based financial transaction from the audio data responsive to the trigger using an audio deciphering process that deciphers sounds in the audio data that correspond to the financial transaction data.

10. The apparatus of claim 9, wherein the audio deciphering process extracts the financial data from audio content recorded of the fiat currency-based financial transaction.

11. The apparatus of claim 9, wherein the trigger is determined based on the audio cue.

12. The apparatus of claim 11, wherein the input component of the user device includes an audio receiving device, and receiving the audio cue includes receiving, by the audio receiving device of the user device, at least one of a word and a phrase indicative of the fiat currency-based financial transaction.

13. The apparatus of claim 11, wherein the trigger is determined based on the visual cue, the input component of the user device includes an image capturing device, and receiving the visual cue includes receiving, by the image capturing device of the user device, at least one of a still image and a moving image indicative of the fiat currency-based financial transaction.

14. The apparatus of claim 9, wherein determining that the at least one of the audio cue and the visual cue corresponds to the trigger indicating the potential transaction further comprises:
  identifying location data indicative of a geographical position of the user device;
  determining that the user device is located at or near a merchant location, based on the location data indicative of the geographical position of the device; and
  determining that the at least one of the audio cue and the visual cue corresponds to the trigger for the potential fiat currency-based financial transaction based at least in part on the determination that the user device is located at or near the merchant location.

15. The apparatus of claim 9, wherein the virtual cash register further includes a rules engine module structured to track the extracted financial data relative to one or more predefined accounts based on one or more rules, wherein the one or more rules correlate the one or more predefined accounts to the fiat currency-based financial transaction based on at least one of an amount, a location, a time, and a date of the fiat currency-based financial transaction.

16. A device, comprising:
  a network interface configured to communicate with a financial computing system via a network;
  input logic for receiving data from an input component of the device associated with a user; and
  at least one processor communicably coupled to the input logic, the at least one processor structured to:
  receive a cue from a merchant point-of sale (POS) device;
  determine, via the input logic, that the cue corresponds to a trigger for a potential fiat currency-based financial transaction;
  initiate, by the virtual cash register, an extraction process responsive to the trigger, the extraction process comprising:
    receiving audio data using the input component of the device; and
    extracting financial transaction data regarding the potential financial transaction from the audio data without input from the user and using an audio deciphering process that deciphers sounds in the audio data that correspond to the financial transaction data;
  generate a report regarding the financial transaction data corresponding to the audio data; and
  transmit the report to the financial computing system via the network.

17. The device of claim 16, wherein the cue is a broadcast signal received from the merchant POS device.

18. The device of claim 17, wherein the broadcast signal includes a merchant category code.

19. The device of claim 16, wherein the potential financial transaction is a fiat currency-based transaction using at least one of paper currency and coin currency.

20. The device of claim 16, wherein the at least one processor is further structured to cause an update to an account held by the user based on the report.

21. The device of claim 16, wherein the update is based on at least one predefined rule, wherein the at least one predefined rule tracks financial transaction data for the account based on at least one of an amount, a location, a time, and a date of the potential financial transaction.

22. A device, comprising:
  a location positioning system structured to receive location data indicative of a location of the device of a user; and
  a virtual cash register implemented on the device, the virtual cash register comprising:
    a registration module structured to facilitate registration of the virtual cash register with the device;
    a detection module structured to determine that the location data corresponds to a trigger indicating a fiat currency-based financial transaction, the trigger being based on the location data indicating that the device is at or near a merchant location; and
    a transaction module structured to perform an extraction process responsive to the trigger, the extraction process comprising:
      receiving audio data using an input component of the device; and
      extracting, by the virtual cash register via the user device, financial data regarding the fiat currency-based financial transaction using an audio deciphering process that deciphers sounds in the audio data that correspond to the financial transaction data.

23. The device of claim 22, wherein the audio deciphering process extracts the financial data from audio content recorded of the fiat currency-based financial transaction.

24. The device of claim 22, wherein the location data is received from a merchant device.

25. The device of claim 24, wherein the location data is based on an indication that the device of the user logged on to a WiFi network of the merchant.

26. The device of claim 24, wherein location data is based on an image of the user captured by a camera of the merchant.

27. The device of claim 22, wherein the virtual cash register further includes a rules engine module structured to track the extracted financial data relative to one or more predefined financial accounts held by the user based on one or more rules, wherein the one or more rules correlate the one or more predefined financial accounts to the fiat currency-based financial transaction based on at least one of an amount, a location, a time, and a date of the fiat currency-based financial transaction.

28. The device of claim 22, wherein the detection module is structured to confirm no fiat currency-based financial transaction based on the location data indicating that the device is outside a predefined distance of the merchant location.

* * * * *